US012078991B2

(12) United States Patent
Omari et al.

(10) Patent No.: US 12,078,991 B2
(45) Date of Patent: Sep. 3, 2024

(54) RELATIVE IMAGE CAPTURE DEVICE ORIENTATION CALIBRATION

(71) Applicant: GoPro, Inc., San Mateo, CA (US)

(72) Inventors: Sammy Omari, Zurich (CH); Pascal Gohl, Winterthur (CH); Axel Murguet, Zurich (CH); Garance Bruneau, Zurich (CH); Fabio Diem, Zurich (CH); Lukas Schmid, Zurich (CH)

(73) Assignee: GoPro, Inc., San Mateo, CA (US)

( * ) Notice: Subject to any disclaimer, the term of this patent is extended or adjusted under 35 U.S.C. 154(b) by 159 days.

(21) Appl. No.: 17/354,326

(22) Filed: Jun. 22, 2021

(65) Prior Publication Data

US 2021/0389764 A1 Dec. 16, 2021

Related U.S. Application Data

(63) Continuation of application No. 15/906,738, filed on Feb. 27, 2018, now Pat. No. 11,048,257.

(Continued)

(51) Int. Cl.
*G05D 1/00* (2024.01)
*B64C 39/02* (2023.01)
(Continued)

(52) U.S. Cl.
CPC ......... *G05D 1/0094* (2013.01); *G05D 1/0022* (2013.01); *G05D 1/0038* (2013.01);
(Continued)

(58) Field of Classification Search
CPC .. G05D 1/0094; G05D 1/0022; G05D 1/0038; B64C 39/024; G06T 7/74;
(Continued)

(56) References Cited

U.S. PATENT DOCUMENTS 9,230,335 B2 * 1/2016 Karlov ............... G06T 7/277
9,497,380 B1 11/2016 Jannard
(Continued)

OTHER PUBLICATIONS

International Preliminary Report on Patentability for App. No. PCT/US2019/012037, mailing date Aug. 6, 2020, 8 pages.

(Continued)

*Primary Examiner* — Tyler D Paige
(74) *Attorney, Agent, or Firm* — Young Basile Hanlon & MacFarlane, P.C.

(57) ABSTRACT

Controlling an unmanned aerial vehicle may include obtaining a first image from a fixed orientation image capture device of the unmanned aerial vehicle, obtaining a second image from an adjustable orientation image capture device of the unmanned aerial vehicle, obtaining feature correlation data based on the first image and the second image, obtaining relative image capture device orientation calibration data based on the feature correlation data, the relative image capture device orientation calibration data indicating an orientation of the adjustable orientation image capture device relative to the fixed orientation image capture device, obtaining relative object orientation data based on the relative image capture device orientation calibration data, the relative object orientation data representing a three-dimensional orientation of an external object relative to the adjustable orientation image capture device, and controlling a trajectory of the unmanned aerial vehicle in response to the relative object orientation data.

20 Claims, 3 Drawing Sheets

Related U.S. Application Data

(60) Provisional application No. 62/620,771, filed on Jan. 23, 2018.

(51) Int. Cl.
*B64U 30/20* (2023.01)
*G06T 7/73* (2017.01)
*G06T 7/80* (2017.01)
*H04N 7/18* (2006.01)
*B64U 10/14* (2023.01)
*B64U 20/87* (2023.01)
*B64U 101/30* (2023.01)

(52) U.S. Cl.
CPC .................. *G06T 7/74* (2017.01); *G06T 7/80* (2017.01); *H04N 7/185* (2013.01); *B64U 10/14* (2023.01); *B64U 20/87* (2023.01); *B64U 2101/30* (2023.01); *B64U 2201/10* (2023.01); *B64U 2201/20* (2023.01); *G06T 2207/10032* (2013.01); *G06T 2207/30244* (2013.01)

(58) Field of Classification Search
CPC ............. G06T 7/80; G06T 2207/10032; G06T 2207/30244; H04N 7/185; B64U 10/13; B64U 30/20; B64U 2201/10; B64U 2201/20; B64U 2101/30
USPC .............................................................. 701/3
See application file for complete search history.

(56) References Cited

U.S. PATENT DOCUMENTS

| | | | |
|---|---|---|---|
| 9,497,443 B1 * | 11/2016 | Sundheimer | G06T 7/00 |
| 9,854,165 B2 | 12/2017 | Wang | |
| 10,181,080 B2 | 1/2019 | Schultz | |
| 10,430,695 B2 | 10/2019 | Sathyanarayana | |
| 10,979,615 B2 * | 4/2021 | Wang | G01S 3/7864 |
| 11,048,257 B2 * | 6/2021 | Omari | G05D 1/0038 |
| 11,263,461 B2 * | 3/2022 | Marty | H04N 23/63 |
| 2015/0248584 A1 | 9/2015 | Greveson | |
| 2016/0076892 A1 | 3/2016 | Zhou | |
| 2017/0041553 A1 * | 2/2017 | Cao | H04N 5/265 |
| 2017/0063998 A1 * | 3/2017 | Fink | H04L 65/80 |
| 2017/0221226 A1 | 8/2017 | Shen | G06T 7/80 |
| 2017/0275023 A1 * | 9/2017 | Harris | G05D 1/102 |
| 2017/0351900 A1 * | 12/2017 | Lee | H04N 23/662 |
| 2018/0025498 A1 * | 1/2018 | Omari | G06V 20/13 |
| | | | 348/144 |
| 2018/0035606 A1 | 2/2018 | Burdoucci | |
| 2018/0046186 A1 | 2/2018 | Miller | |
| 2018/0046187 A1 * | 2/2018 | Martirosyan | G05D 1/0094 |
| 2018/0073918 A1 | 3/2018 | Onasch | |
| 2018/0096611 A1 * | 4/2018 | Kikuchi | G08G 5/0086 |
| 2018/0143627 A1 | 5/2018 | Lee | |
| 2018/0157252 A1 | 6/2018 | Lee | |
| 2018/0158197 A1 | 6/2018 | Dasgupta | |
| 2018/0164801 A1 | 6/2018 | Kim | |
| 2018/0362157 A1 | 12/2018 | Teetzel | |
| 2019/0004543 A1 * | 1/2019 | Kennedy | H04N 23/71 |
| 2019/0051192 A1 | 2/2019 | Schick | |
| 2019/0075252 A1 | 3/2019 | Zhao | |
| 2019/0161186 A1 | 5/2019 | Chen | |
| 2019/0227556 A1 * | 7/2019 | Omari | G05D 1/0038 |
| 2019/0373173 A1 | 12/2019 | Wang | |
| 2019/0377345 A1 | 12/2019 | Bachrach | |

OTHER PUBLICATIONS

International Search Report and Written Opinion for Application No. PCT/US2019/012037, date of mailing Apr. 25, 2019, 9 pages.

Matthias Faessler et al., "Autonomous, Vision-based flight and live dense 3D mapping with a quadrotor micro aerial vehicle", Mar. 17, 2015, https://onlinelibrary.wiley.com/doi/abs/10.1002/rob.21581.

* cited by examiner

RELATIVE IMAGE CAPTURE DEVICE ORIENTATION CALIBRATION

CROSS REFERENCE TO RELATED APPLICATIONS

This application is a continuation of U.S. application Ser. No. 15/906,738, filed Feb. 27, 2018, which claims the benefit of U.S. Provisional Application No. 62/620,771, filed Jan. 23, 2018, the contents of which are incorporated by reference herein in its entirety.

TECHNICAL FIELD

This disclosure relates to unmanned aerial vehicles (UAVs).

BACKGROUND

An unmanned aerial vehicle may operate in an environment that includes obstacles, such as external objects. Accordingly, including functionality for detecting objects, such as to determine a position of the unmanned aerial vehicle relative to the object, a distance between the unmanned aerial vehicle and the object, a relative trajectory of the object, or the like, in an unmanned aerial vehicle would be advantageous.

SUMMARY

Systems and techniques for relative image capture device orientation calibration are described herein.

One aspect of the disclosure is an unmanned aerial vehicle including a fixed orientation image capture device, an adjustable orientation image capture device, and a processor configured to execute instruction stored on a non-transitory computer readable medium to control the unmanned aerial vehicle to traverse a portion of an operational environment of the unmanned aerial vehicle using relative image capture device orientation calibration by obtaining a first image from the fixed orientation image capture device, obtaining a second image from the adjustable orientation image capture device, obtaining feature correlation data based on the first image and the second image, obtaining relative image capture device orientation calibration data based on the feature correlation data, the relative image capture device orientation calibration data indicating an orientation of the adjustable orientation image capture device relative to the fixed orientation image capture device, and obtaining relative object orientation data based on the relative image capture device orientation calibration data, the relative object orientation data representing a three-dimensional orientation of an external object relative to the adjustable orientation image capture device. The unmanned aerial vehicle includes a trajectory controller configured to control a trajectory of the unmanned aerial vehicle in response to the relative object orientation data.

Another aspect of the disclosure is a method for controlling, by a processor in response to instructions stored on a non-transitory computer readable medium, an unmanned aerial vehicle to traverse a portion of an operational environment of the unmanned aerial vehicle using relative image capture device orientation calibration. The method includes obtaining a first image from a fixed orientation image capture device of the unmanned aerial vehicle, obtaining a second image from an adjustable orientation image capture device of the unmanned aerial vehicle, obtaining feature correlation data based on the first image and the second image, obtaining relative image capture device orientation calibration data based on the feature correlation data, the relative image capture device orientation calibration data indicating an orientation of the adjustable orientation image capture device relative to the fixed orientation image capture device, obtaining relative object orientation data based on the relative image capture device orientation calibration data, the relative object orientation data representing a three-dimensional orientation of an external object relative to the adjustable orientation image capture device, and controlling a trajectory of the unmanned aerial vehicle in response to the relative object orientation data.

Another aspect of the disclosure is a non-transitory computer-readable storage medium, comprising processor-executable instructions for controlling, by a processor in response the instructions, an unmanned aerial vehicle to traverse a portion of an operational environment of the unmanned aerial vehicle using relative image capture device orientation calibration by obtaining a first image from a fixed orientation image capture device of the unmanned aerial vehicle, obtaining a second image from an adjustable orientation image capture device of the unmanned aerial vehicle, obtaining feature correlation data based on the first image and the second image, obtaining relative image capture device orientation calibration data based on the feature correlation data, the relative image capture device orientation calibration data indicating an orientation of the adjustable orientation image capture device relative to the fixed orientation image capture device, obtaining relative object orientation data based on the relative image capture device orientation calibration data, the relative object orientation data representing a three-dimensional orientation of an external object relative to the adjustable orientation image capture device, and controlling a trajectory of the unmanned aerial vehicle in response to the relative object orientation data.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Unmanned mobile apparatus, such as an unmanned aerial vehicle, may operate in an environment, such as three-dimensional space over time. The operational environment may include external objects, such as flora, fauna, the earth, buildings, vehicles, or the like. External objects may obstruct or interfere with the operation of the apparatus. The position or trajectory of the unmanned aerial vehicle may be controlled or adjusted relative to an external object.

Operational modes, including operator controlled modes, autonomous modes, and semi-autonomous modes, may use sensors of the apparatus to detect, orient to, and avoid obstacles. For example, an unmanned aerial vehicle may include a fixed orientation image capture device, such as a front looking stereo camera or a down-looking visual-positioning camera, and an adjustable orientation image capture device, which may be connected to or mounted on the unmanned aerial vehicle via a gimbal, and unmanned aerial vehicle operation may include controlling the position or trajectory of the unmanned aerial vehicle based on images captured by the fixed orientation image capture device, the adjustable orientation image capture device, or both.

The accuracy, efficiency, or both, of unmanned aerial vehicle control based, at least in part, on images captured by the adjustable orientation image capture device may be limited based on the accuracy of relative orientation calibration information indicating an orientation of the adjustable orientation image capture device relative to the fixed orientation image capture device and the unmanned aerial vehicle. Gimbal orientation calibration may include calibrating the relative orientation of the adjustable orientation image capture device relative to the fixed orientation image capture device and the unmanned aerial vehicle based on image data captured by the respective image capture devices.

Figure 1:
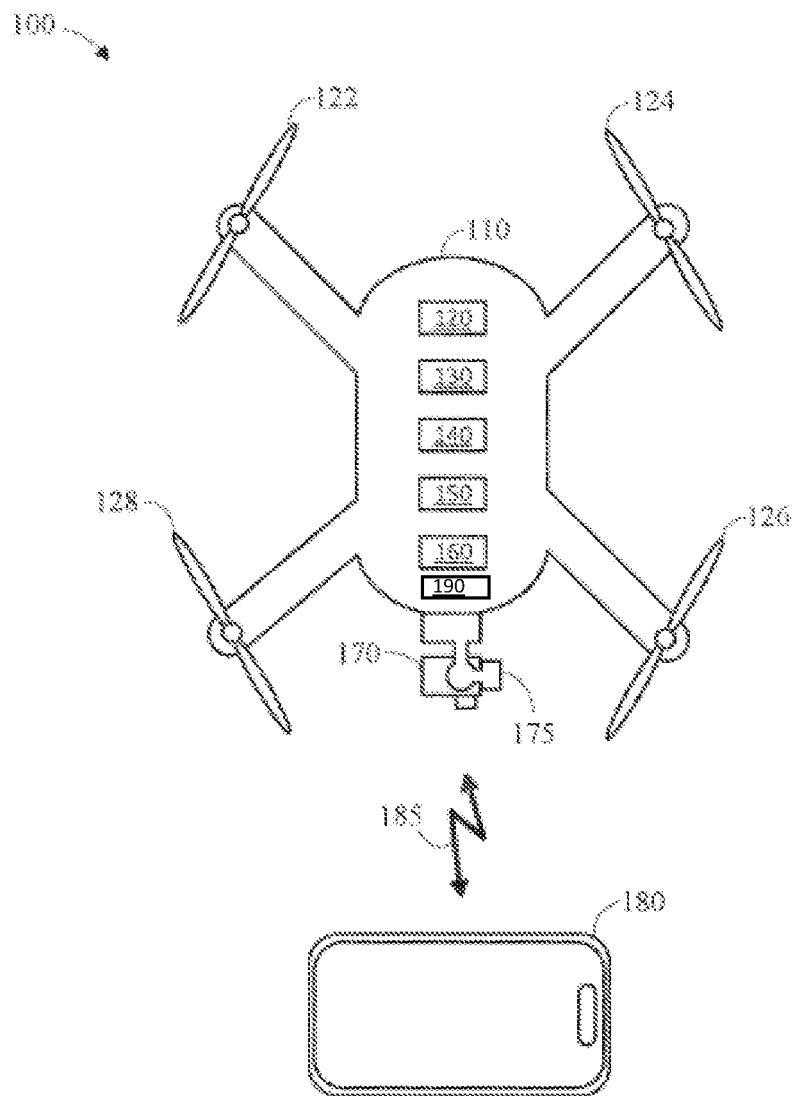
FIG. 1 shows an example of an unmanned aerial vehicle in accordance with this disclosure

FIG. 1 shows an example of an unmanned aerial vehicle 100 in accordance with this disclosure. For simplicity and clarity, the unmanned aerial vehicle 100 is shown in FIG. 1 in a quad-copter configuration. As shown, the unmanned aerial vehicle 100 includes a body 110, a propulsion unit 120, a motor 130, a power supply unit 140, a control unit 150, a communications unit 160, a sensor 170, and a sensor 190. Although not shown in FIG. 1, the unmanned aerial vehicle 100 may include any other component or combination of components of an unmanned aerial vehicle. The orientation or position of the motor 130, the power supply unit 140, the control unit 150, the communications unit 160, the sensor 170, and the sensor 190 are shown for simplicity and clarity, any other orientation may be used.

The body 110 may be a structure, a chassis, a platform, a housing, or an enclosure. For example, a movable quad-copter drone platform is shown in FIG. 1. The propulsion unit 120, the motor 130, the power supply unit 140, the control unit 150, the communications unit 160, the sensor 170, the sensor 190, or any other component of the unmanned aerial vehicle 100 may be coupled to, such as mounted, movably attached, fixed, or otherwise incorporated or physically connected to the body 110.

The propulsion unit 120 may include, or may be operatively coupled with, four rotors 122, 124, 126, 128 in the quad-copter configuration shown. Other propulsion units, such as propulsion units including a different number or configuration of rotors, may be used.

Components of the unmanned aerial vehicle 100, such as the propulsion unit 120, the motor 130, the power supply unit 140, the control unit 150, the communications unit 160, and the sensor 170 may be operatively interconnected. For example, the power supply unit 140 may be operatively connected to the propulsion unit 120, the motor 130, the control unit 150, the communications unit 160, the sensor 170, or a combination thereof, to supply power to the respective components. In another example, the control unit 150 may be operatively connected to the propulsion unit 120, the motor 130, the power supply unit 140, the communications unit 160, the sensor 170, or a combination thereof, to control the operation of the respective components.

The motor 130 may be, for example, an electric motor which may be operatively coupled to, and may receive power from, the power supply unit 140. Although one motor 130 is shown in FIG. 1, each rotor 122, 124, 126, 128 of the propulsion unit 120 may be driven by a respective electric motor.

The power supply unit 140 may be, for example, a battery pack mounted on or in the body 110 of the unmanned aerial vehicle 100, and may supply electrical power to the propulsion unit 120, the motor 130, the communications unit 160, the sensor 170, or any other component or combination of components of the unmanned aerial vehicle 100.

The sensor 170 may obtain, capture, or generate sensor data. For example, the sensor 170 may be an image capture apparatus, which may include an image capture device, such as a camera, which may obtain, capture, or generate, image content, such as images, video, or both.

Although not expressly shown in FIG. 1, an image capture device may include a lens or another optical element, for receiving and focusing light, and an image sensor for converting the received and focused light to an image signal, such as by measuring or sampling the light. The sensor 170 may have a field-of-view. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element.

Although not expressly shown in FIG. 1, an image capture device may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, the sensor 170 may include one or more microphones, which may receive, capture, and record audio information. For example, the sensor 170 may include an image sensor and an audio sensor and audio information captured by the audio sensor may be associated with images acquired by the image sensor.

Although not expressly shown in FIG. 1, the sensor 170 may include one or more other information sources or sensors, such as an inertial measurement unit (IMU), a global positioning system (GPS) receiver component, a pressure sensor, a temperature sensor, or any other unit, or combination of units, that may be included in the unmanned aerial vehicle 100.

The unmanned aerial vehicle 100 may interface with or communicate with an external device, such as the external user interface (UI) device 180, via a wired (not shown) or wireless (as shown) computing communication link 185. Although a single computing communication link 185 is shown in FIG. 1 for simplicity, any number of computing communication links may be used. Although the computing communication link 185 shown in FIG. 1 is shown as a direct computing communication link, an indirect computing communication link, such as a link including another device or a network, such as the internet, may be used.

In some implementations, the computing communication link 185 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 185 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

The user interface device 180 may be a computing device, such as a smartphone, a tablet computer, a phablet, a smart watch, a portable computer, and/or another device or combination of devices configured to receive user input, communicate information with the unmanned aerial vehicle 100 via the computing communication link 185, or receive user input and communicate information with the unmanned aerial vehicle 100 via the computing communication link 185.

The unmanned aerial vehicle 100 may transmit images, such as panoramic images, or portions thereof, to the user interface device 180 via the computing communication link 185, and the user interface device 180 may store, process, display, or a combination thereof the images. The user interface device 180 may display, or otherwise present, content, such as images or video, acquired by the unmanned aerial vehicle 100. The user interface device 180 may communicate information, such as metadata or control information, to the unmanned aerial vehicle 100. In some implementations, the unmanned aerial vehicle 100 may communicate with one or more other external devices (not shown) via wired or wireless computing communication links (not shown).

The sensor 170, or a portion thereof, may be coupled to the body 110 of the unmanned aerial vehicle 100 via a controllable sensor orientation unit 175. For example, the sensor orientation unit 175 may removably mount the sensor 170, or a portion thereof, to the unmanned aerial vehicle 100. The sensor orientation unit 175 may be, for example, a three-axis gimbal for controlling, such as rotating, the orientation of the sensor 170, or a portion thereof, about three independent axes. The sensor orientation unit 175 may include any type of translational elements, rotational elements, or both, that permit rotational movement, translational movement, or both, in one, two, or three dimensions of the sensor 170 with respect to the unmanned aerial vehicle 100.

The user interface device 180 may include a communications interface (not expressly shown) via which the user interface device 180 may receive and send messages, such as commands, related to operation of the unmanned aerial vehicle 100, the sensor 170, the sensor orientation unit 175, or a combination thereof. The commands can include movement commands, configuration commands, operational control commands, imaging commands, or a combination thereof.

For example, flight direction, attitude, altitude, or a combination thereof, of the unmanned aerial vehicle 100 may be controlled by the user interface device 180, such as by controlling respective speeds of the motors 130 that drive the respective rotors 122, 124, 126, 128 of the propulsion unit 120 of the unmanned aerial vehicle 100. In an example, the sensor 170 may include a GPS receiver, which may provide navigational data to the user interface device 180, which may be used in determining flight paths and displaying current location through the user interface device 180. A vision-based navigation system may be implemented that correlates visually significant features through image data captured by the sensor 170 to provide navigation data, such as the speed and position of the unmanned aerial vehicle 100, to the user interface device 180.

The user interface device 180 may implement a software application, such as GoPro Studio®, GoPro App®, or the like, configured to perform operations related to configuration of orientation or positioning of the sensor 170 via the sensor orientation unit 175, and control of video acquisition, and/or display of video captured by the sensor 170 through the user interface device 180. An application, such as the GoPro App®, may enable a user to create short video clips and share video clips to a cloud service (e.g., Instagram®, Facebook®, YouTube®, Dropbox®); perform full remote control of functions of the sensor 170; live preview video being captured for shot framing; mark key moments while recording (e.g., HiLight Tag®, View HiLight Tags in GoPro Camera Roll®) for location and/or playback of video highlights; wirelessly control camera software; and/or perform other functions.

Although the unmanned aerial vehicle 100 is shown in FIG. 1 in a quad-copter configuration for simplicity and clarity, any unmanned aerial vehicle configuration may be used. In some implementations, one or more of the units of the unmanned aerial vehicle 100 shown in FIG. 1 may be combined or omitted. For example, the communications unit 160, sensor 170, the sensor orientation unit 175, or a combination thereof, may be omitted.

Figure 2:
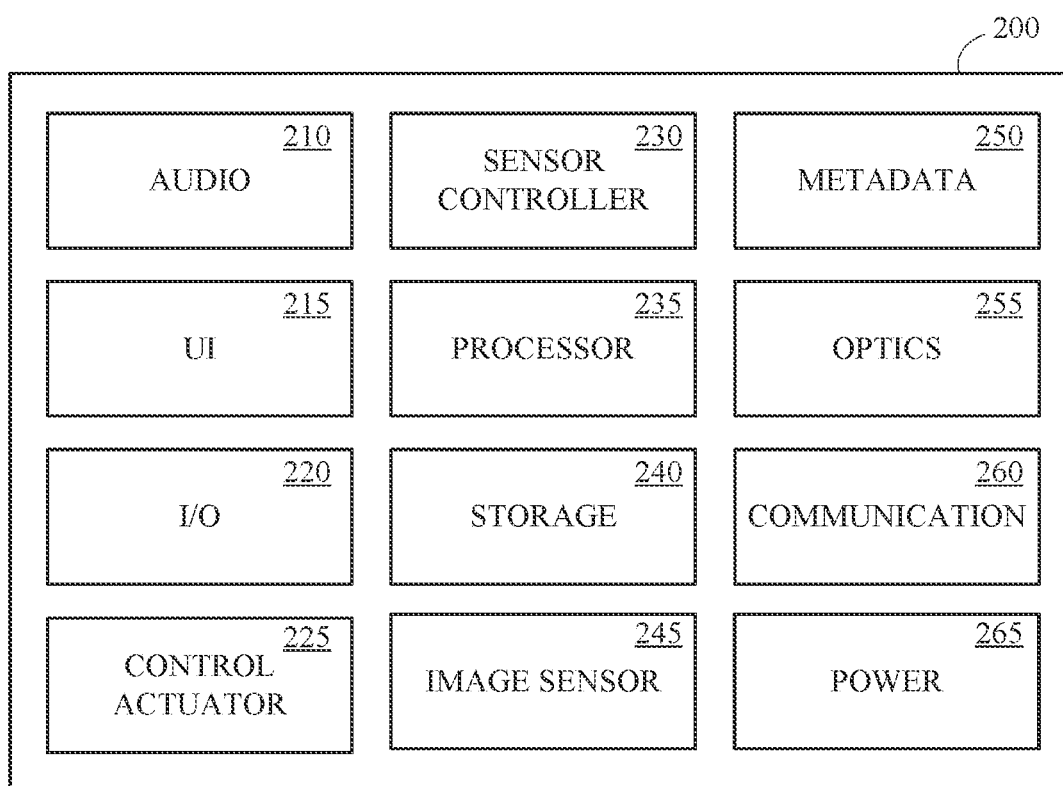
FIG. 2 is a block diagram of an example of a computing device in accordance with implementations of this disclosure

FIG. 2 is a block diagram of an example of a computing device 200 in accordance with implementations of this disclosure. As shown, the computing device 200 includes an audio component 210, a user interface (UI) unit 215, an input/output (I/O) unit 220, a control actuator unit 225, a sensor controller 230, a processor 235, an electronic storage unit 240, an image sensor 245, a metadata unit 250, an optics unit 255, a communication unit 260, and a power supply 265.

For example, an unmanned aerial vehicle, such as the unmanned aerial vehicle 100 shown in FIG. 1, may include the computing device 200. In another example, a user interface device, such as the user interface device 180 shown in FIG. 1, may include the computing device 200. Some elements of the unmanned aerial vehicle 100 or the user interface device 180 shown in FIG. 1 may correspond with respective elements of the computing device 200 shown in FIG. 2.

The audio component 210, which may include a microphone, may receive, sample, capture, record, or a combination thereof audio information, such as sound waves. Audio information captured by the audio component 210 may be associated with, such as stored in association with, image or video content, such as image or video content contemporaneously captured by the computing device 200.

The audio information captured by the audio component 210 may be encoded. For example, the audio information captured by the audio component 210 may be encoded using a codec, such as Advanced Audio Coding (AAC), Audio Compression—3 (AC3), Moving Picture Experts Group Layer-3 Audio (MP3), linear Pulse Code Modulation (PCM), Motion Picture Experts Group—High efficiency coding and media delivery in heterogeneous environments (MPEG-H), and/or other audio coding formats or codecs.

In some implementations, such as implementations implementing spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

The user interface unit 215 may include a user input interface unit. The user input interface unit may include one or more units that may register or receive input from a user, such as a touch interface, a proximity sensitive interface, a light receiving unit, a sound receiving unit, or a combination thereof.

The user interface unit 215 may include a user interface presentation unit. The user interface presentation unit may present, such as display, a user interface, or a portion thereof, or other user presentable output.

Aspects of the user input interface unit and the user interface presentation unit may be combined. For example, the user interface unit 215 may include a light receiving and emitting unit, a sound receiving and emitting unit, or the like. In some implementations, the user interface unit 215 may include a display, one or more tactile elements, such as buttons, which may be virtual touch screen buttons, lights (LEDs), speakers, or other user interface elements or combinations of elements. The user interface unit 215 may receive user input from a user related to the operation of the computing device 200. The user interface unit 215 may provide information to a user related to the operation of the computing device 200.

The user interface unit 215 may include a display unit for presenting information, such as information related to camera control or unmanned aerial vehicle control, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 215 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

The I/O unit 220 may synchronize the computing device 200 with other devices, such as other external devices. For example, the computing device 200 may be implemented in an unmanned aerial vehicle, such as the unmanned aerial vehicle 100 shown in FIG. 1, and I/O unit 220 may synchronize the computing device 200 in the unmanned aerial vehicle with another computing device implemented in a user interface device, such as the user interface device 180 shown in FIG. 1.

The I/O unit 220 may communicate information between I/O components. In some implementations, the I/O unit 220 may be connected to the communication unit 260 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 180 shown in FIG. 1, or another metadata source. In some implementations, the I/O unit 220 may interface with LED lights, a display, a button, a microphone, speakers, and/or other I/O components. In some implementations, the I/O unit 220 may interface with the power supply 265.

The I/O unit 220 of the computing device 200 may include one or more connections to external computerized devices for configuration and/or management of remote devices, as described herein. The I/O unit 220 may include any of the wireless or wireline interfaces described herein, and/or may include customized or proprietary connections for specific applications.

The control actuator unit 225 may be a dedicated processing unit for controlling or actuating a device or unit associated with, such as coupled to or incorporated with, the computing device 200. For example, the computing device 200 may be included in an apparatus, such as the unmanned aerial vehicle 100 shown in FIG. 1, and the control actuator unit 225 may control the actuation of a unit of the apparatus, such as the controllable sensor orientation unit 175. Although shown separately from the processor 235 in FIG. 2, the processor 235 may include the control actuator unit 225.

The sensor controller 230 may operate or control the image sensor 245, such as in response to input, such as user input. For example, the sensor controller 230 may receive image and/or video input from the image sensor 245 and may receive audio information from the audio component 210.

The processor 235 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the computing device 200. The processor 235 may interface with the sensor controller 230 to obtain and process sensory information, such as for object detection, face tracking, stereo vision, and/or other image processing.

The sensor controller 230, the processor 235, or both may synchronize information received by the computing device 200. For example, timing information may be associated with received sensor data, and metadata information may be related to content, such as images or videos, captured by the image sensor 245 based on the timing information. In some implementations, the metadata capture may be decoupled from video/image capture. For example, metadata may be stored before, after, and in-between the capture, processing, or storage of one or more video clips and/or images.

The sensor controller 230, the processor 235, or both may evaluate or process received metadata and may generate other metadata information. For example, the sensor controller 230 may integrate the received acceleration information to determine a velocity profile for the computing device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 215, the I/O unit 220, the sensor controller 230, the processor 235, the electronic storage unit 240, the image sensor 245, the metadata unit 250, the optics unit 255, the communication unit 260, or the power supply 265 of the computing device 200 may communicate information, power, or both with one or more other units, such as via an electronic communication pathway, such as a system bus. For example, the processor 235 may interface with the audio component 210, the user interface unit 215, the I/O unit 220, the sensor controller 230, the electronic storage unit 240, the image sensor 245, the metadata unit 250, the optics unit 255, the communication unit 260, or the power supply 265 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 235 in accordance with a defined schedule, such as values of latitude, longitude, and elevation at 10 Hz.

The electronic storage unit 240 may include a system memory module that may store executable computer instructions that, when executed by the processor 235, perform various functionalities including those described herein. For example, the electronic storage unit 240 may be a non-transitory computer-readable storage medium, which may include executable instructions, and a processor, such as the processor 235 may execute the instruction to perform one or more, or portions of one or more, of the operations described herein. The electronic storage unit 240 may include storage memory for storing content, such as metadata, images, audio, or a combination thereof, captured by the computing device 200.

The electronic storage unit 240 may include non-transitory memory for storing configuration information and/or processing code for video information and metadata capture, and/or to produce a multimedia stream that may include video information and metadata in accordance with the present disclosure. The configuration information may include capture type, such as video or still image, image resolution, frame rate, burst setting, white balance, recording configuration, such as loop mode, audio track configuration, and/or other parameters that may be associated with audio, video, and/or metadata capture. The electronic storage unit 240 may include memory that may be used by other hardware/firmware/software elements of the computing device 200.

The image sensor 245 may include one or more of a charge-coupled device sensor, an active pixel sensor, a complementary metal-oxide semiconductor sensor, an N-type metal-oxide-semiconductor sensor, and/or another image sensor or combination of image sensors. The image sensor 245 may be controlled based on control signals from a sensor controller 230.

The image sensor 245 may sense or sample light waves gathered by the optics unit 255 and may produce image data or signals. The image sensor 245 may generate an output signal conveying visual information regarding the objects or other content corresponding to the light waves received by the optics unit 255. The visual information may include one or more of an image, a video, and/or other visual information.

The image sensor 245 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

The metadata unit 250 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. The computing device 200 may contain one or more other sources of metadata information, telemetry, or both, such as image sensor parameters, battery monitor, storage parameters, and/or other information related to camera operation and/or capture of content. The metadata unit 250 may obtain information related to the environment of the computing device 200 and aspects in which the content is captured.

For example, the metadata unit 250 may include an accelerometer that may provide device motion information including velocity and/or acceleration vectors representative of motion of the computing device 200. In another example, the metadata unit 250 may include a gyroscope that may provide orientation information describing the orientation of the computing device 200. In another example, the metadata unit 250 may include a global positioning system sensor that may provide global positioning system coordinates, time, and information identifying a location of the computing device 200. In another example, the metadata unit 250 may include an altimeter that may obtain information indicating an altitude of the computing device 200.

The metadata unit 250, or one or more portions thereof, may be rigidly coupled to the computing device 200 such that motion, changes in orientation, or changes in the location of the computing device 200 may be accurately detected by the metadata unit 250. Although shown as a single unit, the metadata unit 250, or one or more portions thereof, may be implemented as multiple distinct units. For example, the metadata unit 250 may include a temperature sensor as a first physical unit and a global positioning system unit as a second physical unit. In some implementations, the metadata unit 250, or one or more portions thereof, may be included in a computing device 200 as shown, or may be included in a physically separate unit operatively coupled to, such as in communication with, the computing device 200.

The optics unit 255 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 255 may include a focus controller unit that may control the operation and configuration of the camera lens. The optics unit 255 may receive light from an object and may focus received light onto an image sensor 245. Although not shown separately in FIG. 2, in some implementations, the optics unit 255 and the image sensor 245 may be combined, such as in a combined physical unit, such as a housing.

The communication unit 260 may be coupled to the I/O unit 220 and may include a component, such as a dongle, having an infrared sensor, a radio frequency transceiver and antenna, an ultrasonic transducer, and/or other communications interfaces used to send and receive wireless communication signals. The communication unit 260 may include a local, such as Bluetooth or Wi-Fi, and/or broad range, such as cellular LTE, communications interface for communication between the computing device 200 and a remote device, such as the user interface device 180 in FIG. 1. The communication unit 260 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 260 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 260 may be represented using formats including one or more of hypertext markup language (HTML), extensible markup language (XML), and/or other formats. One or more exchanges of information between the computing device 200 and remote or external devices may be encrypted using encryption technologies including one or more of secure sockets layer (SSL), transport layer security (TLS), virtual private networks (VPNs), Internet Protocol security (IPsec), and/or other encryption technologies.

The power supply 265 may supply power to the computing device 200. For example, for a small-sized, lower-power action camera a wireless power solution, such as battery, solar cell, inductive, such as contactless, power source, rectification, and/or other power supply, may be used.

Consistent with the present disclosure, the components of the computing device 200 may be remote from one another and/or aggregated. For example, one or more sensor components may be distal from the computing device 200, such as shown and described with respect to FIG. 1. Multiple mechanical, sensory, or electrical units may be controlled by a learning apparatus via network/radio connectivity.

In some implementations, one or more of the units of the computing device 200 shown in FIG. 2 may be combined or omitted. For example, the audio component 210, the user interface unit 215, the sensor controller 230, the image sensor 245, the metadata unit 250, the optics unit 255, the communication unit 260, or a combination thereof, may be omitted.

Figure 3:
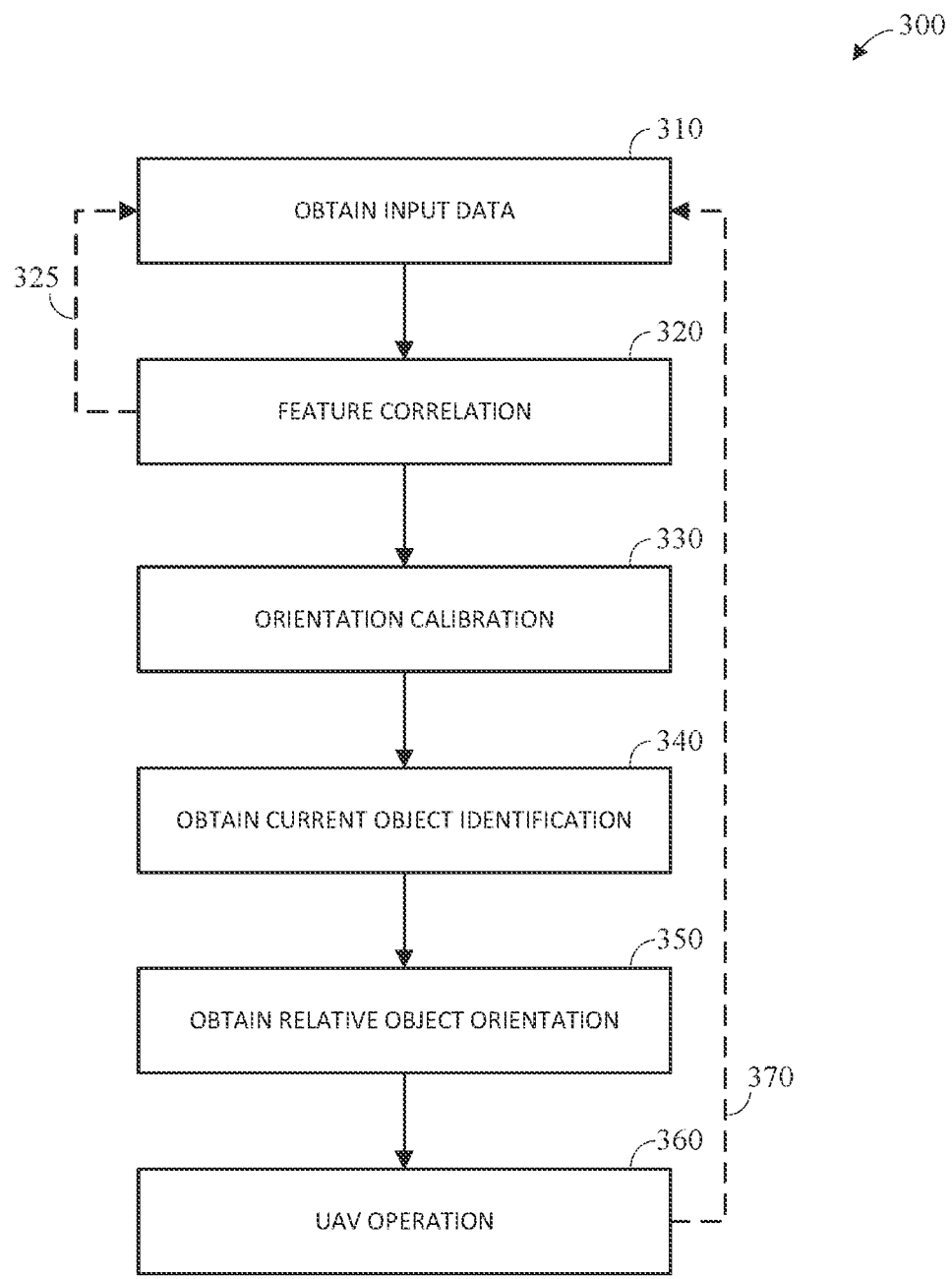
FIG. 3 is a diagram of an example of unmanned aerial vehicle operation including relative image capture device orientation calibration in accordance with implementations of this disclosure.

FIG. 3 is a diagram of an example of unmanned aerial vehicle operation including relative image capture device orientation calibration in accordance with implementations of this disclosure. Unmanned aerial vehicle operation 300 may be implemented in an unmanned aerial vehicle, such as the unmanned aerial vehicle 100 shown in FIG. 1, which may include sensors, such as the sensor 170 shown in FIG. 1. For example, an unmanned aerial vehicle may include a fixed orientation image capture device, such as a front looking stereo camera or a down-looking visual-positioning camera, and the unmanned aerial vehicle may include an adjustable orientation image capture device, which may be connected to or mounted on the unmanned aerial vehicle via a gimbal, such as the sensor orientation unit 175 shown in FIG. 1. Although described as having a fixed orientation for simplicity and clarity, the orientation of the fixed orientation image capture device may be adjustable.

As shown, unmanned aerial vehicle operation 300 includes obtaining input data at 310, feature correlation at 320, orientation calibration at 330, current object identification at 340, obtaining relative object orientation data at 350, and unmanned aerial vehicle operation at 360. As indicated by the broken directional line at 370, obtaining input data at 310, feature correlation at 320, orientation calibration at 330, current object identification at 340, obtaining relative object orientation data at 350, and unmanned aerial vehicle operation at 360 may be performed any number of times, such as in accordance with a defined rate or frequency. In some implementations, one or more of feature correlation at 320, orientation calibration at 330, current object identification at 340, or obtaining relative object orientation data at 350 may be omitted for one or more frames.

Unmanned aerial vehicle operation 300 may include object detection. For example, the unmanned aerial vehicle may implement obstacle avoidance using object detection. Unmanned aerial vehicle operation 300 may include relative unmanned aerial vehicle positioning, which may include obtaining object orientation information indicating a relative orientation of the unmanned aerial vehicle with respect to an object (object orientation). Relative unmanned aerial vehicle positioning may include automatically controlling or adjusting a three-dimensional location, or a trajectory, of the unmanned aerial vehicle to position the unmanned aerial vehicle relative to an identified current object. Object detection and orientation may include capturing images using one or more image capture devices of the unmanned aerial vehicle and detecting objects in two-dimensional space, three-dimensional space, or both, based on the captured images.

Input data may be obtained at 310. Obtaining the input data may include sensors of the unmanned aerial vehicle obtaining, such as capturing or detecting, data. For example, the fixed orientation image capture device, the adjustable orientation image capture device, or both, may obtain optical, such as image or video, data, such as by capturing respective images of a scene. The input data may capture a representation of objects included in the scene within the field of view of the respective sensor as content or features within the captured images.

Respective images captured by the fixed orientation image capture device and the adjustable orientation image capture device may be temporally synchronous. For example, the fixed orientation image capture device may capture a first image and, concurrently, the adjustable orientation image capture device may capture a second image.

Feature correlation data may be obtained at 320. The feature correlation data may indicate a spatial correlation of a feature, or multiple features, in respective images. For example, the location of a feature in a first image may be spatially correlated with the location of the feature in a second image.

Obtaining the feature correlation data, or feature correlation, may include obtaining feature data for the respective images, which may include feature identification. Feature identification may include analyzing or evaluating an image to obtain the feature data. The feature data may indicate a distinguishable portion of the image corresponding to an object in the scene captured by the image. Multiple features may be identified in an image. For example, feature data may be obtained based on the first image, captured by the fixed orientation image capture device, and feature data may be obtained based on the second image, captured by the adjustable orientation image capture device.

Feature correlation may include correlating features between images based on the feature data and corresponding image data. For example, a feature identified in a first image may be correlated, or matched, such as based on an image data similarity metric, to a feature identified in a second image. Feature correlation may include spatial feature correlation, temporal feature correlation, or a combination thereof.

Spatial feature correlation may include correlating features between temporally synchronous spatially overlapping images. Spatially overlapping images may be images captured by image capture devices having overlapping, or partially overlapping, fields of view. For example, the input data obtained at 310 may include a first image captured by the fixed orientation image capture device and a second image concurrently captured by the adjustable orientation image capture device, and features identified in an overlapping portion of the first image may be correlated to features identified in a corresponding overlapping portion of the second image.

Temporal feature correlation may include correlating features between sequential images captured by an image capture device. For example, current feature data may be obtained for a current image captured by an image capture device and temporal feature correlation data may be obtained by correlating one more features identified in the current image with one or more features identified in a previous image previously captured by the image capture device.

Temporal feature correlation data may be obtained based on images capture by respective image capture devices. For example, first temporal feature correlation data may be obtained based on sequential images captured by a first image capture device, such as the fixed orientation image capture device, and second temporal feature correlation data may be obtained based on sequential images captured by a second image capture device, such as the adjustable orientation image capture device. The images captured by the first image capture device may be temporally synchronous with the images captured by the second image capture device. For example, the current image captured by the first image capture device may be temporally synchronous with the current image captured by the second image capture device and the previous image captured by the first image capture device may be temporally synchronous with the previous image captured by the second image capture device. The field of view of the first image capture device may be spatially disparate, non-overlapping, with the field of view of the second image capture device.

Although not shown separately in FIG. 3, obtaining temporal feature correlation data at 320 may include obtaining relative velocity data based on the temporal feature correlation data. The relative velocity data may indicate a relative velocity of the image capture device that captured the images corresponding to the temporal feature correlation data. For example, first relative velocity data may be obtained based on sequential images captured by a first image capture device, such as the fixed orientation image capture device, and second relative velocity data may be obtained based on sequential images captured by a second image capture device, such as the adjustable orientation image capture device.

Obtaining the feature correlation data at 320 may include storing feature data, feature correlation data, or a combination thereof, such as in a data storage unit, such as a database, of the unmanned aerial vehicle.

Feature correlation at 320 may include determining whether a feature correlation metric is at least, such as is equal to or greater than, a defined feature correlation threshold. The feature correlation metric may be within, such as less than, the defined feature correlation threshold, and obtaining input data at 310 and feature correlation at 320 may be repeated to identify other correlated features as indicated by the broken line directional arrow at 325.

Orientation calibration data may be obtained at 330. The orientation calibration data may indicate an orientation, alignment, or position of the second image capture device, such as the adjustable image capture device, relative to the first image capture device, such as the fixed image capture device. The orientation calibration data may indicate a spatial correlation or mapping between respective pixels, or groups or patches of pixels, from images captured by the second image capture device, respective pixels, or groups or patches of pixels, from images captured by the first image capture device, and three-dimension space.

An orientation accuracy based on the orientation calibration data may exceed an orientation accuracy based on previously identified orientation data. For example, the current relative alignment of the fixed orientation image capture device, the gimbal, the adjustable orientation image capture device, or a combination thereof, may vary from a relative alignment corresponding to the previously identified orientation data, which may limit the orientation accuracy based on the previously identified orientation data.

The current alignment of the fixed orientation image capture device may vary from a previously identified alignment. For example, the current alignment of the fixed orientation image capture device may vary from an alignment indicated in a design specification, of the image capture device, the unmanned aerial vehicle or both, within a defined range of manufacture tolerances. In another example, the current alignment of the fixed orientation image capture device may vary from a previously identified alignment based on operational metrics, such as in response to physical force, temperature variation, material aging, or any other physical or chemical process, or combination of processes, that may change camera alignment.

The current alignment of the gimbal may vary from a previously identified alignment. For example, the current alignment of the gimbal may vary from an alignment indicated in a design specification within a defined range of manufacture tolerances. The current alignment of the gimbal may vary from a previously identified alignment based on operational metrics, such as in response to physical force, temperature variation, material aging, or any other physical or chemical process, or combination of processes, that may change gimbal alignment. For example, the gimbal may be non-rigidly mounted to the unmanned aerial vehicle, such as via dampers, and the alignment of the gimbal may vary in accordance with a range of motion associated with the dampers.

The current alignment of the adjustable orientation image capture device may vary from a previously identified alignment. Variations in the alignment of the adjustable orientation image capture device may include variations based on gimbal motor encoder variations, or variations of the alignment of the adjustable orientation image capture device from an alignment indicated in a design specification within a defined range of manufacture tolerances, or from a previously identified alignment based on operational metrics, such as in response to physical force, temperature variation, material aging, or any other physical or chemical process, or combination of processes, that may change camera alignment.

The orientation calibration data may be obtained at 330 based on the feature correlation data obtained at 320. For example, the feature correlation data obtained at 320 may include spatial feature correlation data, and the orientation calibration data may be obtained based on the spatial feature correlation data, such as using five-point relative positioning, or another multi-point relative positioning technique.

In another example, the feature correlation data obtained at 320 may include relative velocity data, and the orientation calibration data may be obtained based on the relative velocity data by correlating the velocity of the first image capture device to the temporally corresponding velocity of the second image capture device.

In another example, obtaining the feature correlation data at 320 may omit obtaining the relative velocity data, the feature correlation data obtained at 320 may include temporal feature correlation data, and the orientation calibration data may be obtained at 330 based on the temporal feature correlation data using spatiotemporal calibration. Spatiotemporal calibration may include obtaining the orientation calibration data based on bundle adjustment based on the sequential images captured by the first image capture device, such as the fixed orientation image capture device, and the sequential images captured by the second image capture device, such as the adjustable orientation image capture device.

Current object identification data may be obtained at 340. The current object identification data may indicate an object, such as an object in the field of view of one or both of the image capture devices, such as in the field of view of the adjustable orientation image capture device. The current object identification data may be obtained automatically, such as based on object motion. The current object identification data may be obtained based on input, such as user input indicating the current object in an image captured by, for example, the adjustable orientation image capture device. Obtaining the current object identification data at 340 may include obtaining current object motion data, such as two-dimensional motion data indicating motion of the current object between a temporal sequence of images captured by the adjustable orientation image capture device. For example, the two-dimensional motion data may indicate pixel location data for an object in a first frame and corresponding pixel location data for the object in a second frame.

Relative object orientation data may be obtained at 350. Obtaining the relative object orientation data at 350 may include determining a spatial location, trajectory, or both, for the current object, such as by triangulating the current object identified at 340 based on the orientation calibration data obtained at 330.

For example, the first image capture device may be a fixed orientation stereo image capture device, the second image capture device may be an adjustable orientation image capture device, a field of view of the first image capture device may overlap a portion of the field of view of the second image capture device, the current object may be included in the overlapping portion of the respective fields of view, a three-dimensional location, trajectory, or both, may be obtained based on the images captured by the first image capture devices, such as using binocular object detection, and the three-dimensional location relative to the first image capture device may be correlated to a three-dimensional location relative to the second image capture device based on the orientation calibration data obtained at 330.

Unmanned aerial vehicle operation may be performed at 360. The unmanned aerial vehicle operation may be performed based on the orientation calibration data obtained at 330, the relative object orientation data obtained at 350, or a combination thereof. The unmanned aerial vehicle operation may include controlling or adjusting a three-dimensional location, or a trajectory, of the unmanned aerial vehicle to position the unmanned aerial vehicle relative to the current object.

In some embodiments, expected or predicted two-dimensional motion data indicating motion of the current object between temporally subsequent images captured by the adjustable orientation image capture device may be obtained based on the relative object orientation data may be obtained at 350.

In some embodiments, the accuracy, efficiency, or both, of object detection, including depth detection, three-dimensional trajectory detection, or both, based on binocular object detection, such as using a fixed orientation stereo image capture device, may be limited, and monocular object detection may be used for object detection, such as for collision avoidance. For example, a current velocity of the unmanned aerial vehicle may exceed a maximum binocular object detection velocity threshold and the accuracy, efficiency, or both, of binocular object detection may be limited. The monocular object detection may include monocular object detection based on sequential images subsequently captured by the adjustable orientation image capture device and the orientation calibration data obtained at 330. The accuracy, efficiency, or both, of monocular object detection based on sequential images captured by the adjustable orientation image capture device may exceed the accuracy, efficiency, or both of monocular object detection based on sequential images captured by the fixed orientation image capture device. For example, the quality or detail of image information, such as color information, resolution, field of view, and the like, captured by the adjustable orientation image capture device may capture may exceed the quality or detail of image information captured by the fixed orientation image capture device, and the accuracy, efficiency, or both, of monocular object detection may correlate with the quality of the respective image information. In another example, the adjustable orientation image capture device may be stabilized with respect to the current object, which may improve the accuracy, efficiency, or both, of monocular object detection relative to the accuracy, efficiency, or both, of monocular object detection based on the fixed orientation image capture device.

Where certain elements of these implementations may be partially or fully implemented using known components, only those portions of such known components that are necessary for an understanding of this disclosure have been described. Detailed descriptions of other portions of such known components have been omitted so as not to obscure the disclosure. The drawings are for the purpose of illustration and description only and are not intended as a definition of the limits of the disclosure.

As used in the specification and in the claims, the singular form of "a," "an," and "the" include plural referents unless the context clearly dictates otherwise.

An implementation showing a singular component in this disclosure should not be considered limiting; rather, this disclosure is intended to encompass other implementations including a plurality of the same component, and vice-versa, unless explicitly stated otherwise herein. Further, this disclosure encompasses present and future known equivalents to the components referred to herein by way of illustration.

As used herein, the term "bus" is meant generally to denote all types of interconnection or communication architecture that may be used to communicate data between two or more entities. The "bus" could be optical, wireless, infrared or another type of communication medium. The exact topology of the bus could be for example standard "bus," hierarchical bus, network-on-chip, address-event-representation (AER) connection, or other type of communication topology used for accessing, e.g., different memories in a system.

As used herein, the term "computing device" is meant to include personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), as well as object-oriented environments such as the Common Object Request Broker Architecture (CORBA), Java™ (including J2ME, Java Beans), Binary Runtime Environment (e.g., BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLDs), reconfigurable computer fabrics (RCFs), SoCs, application-specific integrated circuits (ASICs), and/or other types of integrated circuits.

As used herein, the term "memory" includes any type of integrated circuit or other storage device adapted for storing digital data including, without limitation, ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "processor," "microprocessor," and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., FPGAs), PLDs, RCFs, array processors, secure microprocessors, ASICs, and/or other digital processing devices. Such digital processors may be contained on a single unitary IC die, or distributed across multiple components.

As used herein, the terms "network interface" and "communications interface" refer to any signal, data, and/or software interface with a component, network, and/or process. By way of non-limiting example, a communications interface may include one or more of FireWire (e.g., FW400, FW110, and/or other variation), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other communications interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

As used herein, the terms "imaging device" and "camera" may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the implementations described herein are in terms of a specific sequence of steps of a method, these descriptions are only illustrative of the broader methods of the disclosure and may be modified as required by the particular applications thereof. Certain steps may be rendered unnecessary or optional under certain circumstances. Additionally, certain steps or functionality may be added to the disclosed implementations, or the order of performance of two or more steps permuted. All such variations are considered to be encompassed within the disclosure.

While the above detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technologies.

What is claimed is:

1. An unmanned aerial vehicle, comprising:
   a fixed orientation image capture device;
   an adjustable orientation image capture device;
   a processor configured to execute instructions stored on a non-transitory computer readable medium to:
   obtain a first image from the fixed orientation image capture device,
   obtain a second image from the adjustable orientation image capture device, obtain relative object orientation data based on a spatial correlation of an external object within the first image and the second image, wherein the spatial correlation includes a location of the external object in the first image relative to a location of the external object in the second image, the relative object orientation data representing a three-dimensional orientation of the external object relative to the adjustable orientation image capture device, and determine relative velocity data based upon comparing the first image captured by the fixed orientation image capture device and the second image captured by the adjustable orientation image capture device; and a controller configured to control a trajectory and velocity of the unmanned aerial vehicle based on the relative object orientation data and the relative velocity data of the external object to track or avoid the external object.

2. The unmanned aerial vehicle of claim 1, wherein the processor is configured to:

obtain feature correlation data based on a comparison of the first image and the second image; and obtain relative image capture device orientation calibration data based on the feature correlation data, the relative image capture device orientation calibration data indicating an orientation of the adjustable orientation image capture device relative to the fixed orientation image capture device, wherein the relative object orientation data is obtained based on the relative image capture device orientation calibration data.

3. The unmanned aerial vehicle of claim 2, wherein a portion of a field of view of the fixed orientation image capture device corresponding to capturing the first image overlaps a portion of a field of view of the adjustable orientation image capture device corresponding to capturing the second image, wherein the processor is configured to:

obtain spatial feature correlation data that indicates a correlation between a feature from the first image and a corresponding feature from the second image to obtain the feature correlation data; and use five-point relative positioning based on the spatial feature correlation data to obtain the relative image capture device orientation calibration data.

4. The unmanned aerial vehicle of claim 2, wherein a field of view of the fixed orientation image capture device corresponding to capturing the first image is non-overlapping with a field of view of the adjustable orientation image capture device corresponding to capturing the second image, wherein the processor is configured to:

obtain temporal feature correlation data to obtain the feature correlation data.

5. The unmanned aerial vehicle of claim 4, wherein the processor is configured to:

obtain the relative image capture device orientation calibration data using spatiotemporal calibration based on the temporal feature correlation data.

6. The unmanned aerial vehicle of claim 4, wherein to obtain the temporal feature correlation data the processor is configured to:

obtain a third image from the fixed orientation image capture device, the third image sequentially subsequent to the first image;

obtain first temporal feature correlation data indicating a correlation between a feature from the first image and a corresponding feature from the third image;

obtain a fourth image from the adjustable orientation image capture device, the fourth image sequentially subsequent to the second image;

obtain second temporal feature correlation data indicating a correlation between a feature from the second image and a corresponding feature from the fourth image;

obtain the relative velocity data as a first velocity data based on the first temporal feature correlation data, the first velocity indicating a velocity of the fixed orientation image capture device; and obtain second velocity data based on the second temporal feature correlation data, the second velocity indicating a velocity of the adjustable orientation image capture device.

7. The unmanned aerial vehicle of claim 6, wherein the relative image capture device orientation calibration data is obtained based on the first velocity data and the second velocity data.

8. A method, comprising:

obtaining a first image from a fixed orientation image capture device of an unmanned aerial vehicle;

obtaining a second image from an adjustable orientation image capture device of the unmanned aerial vehicle;

determining object orientation data based on a spatial correlation of a location of an external object within the first image relative to the second image, the object orientation data representing a three-dimensional orientation of an external object relative to the adjustable orientation image capture device;

determining relative velocity data based upon the first image captured by the fixed orientation image capture device and the second image captured by the adjustable orientation image capture device; and controlling movement and velocity of the unmanned aerial vehicle based on the object orientation data and the relative velocity data of the external object to track or avoid the external object.

9. The method of claim 8, comprising:

controlling a trajectory of the unmanned aerial vehicle based on the object orientation data.

10. The method of claim 8, comprising:

determining feature correlation data based on the first image and the second image; and determining image capture device orientation calibration data based on the feature correlation data, the image capture device orientation calibration data indicating an orientation of the adjustable orientation image capture device relative to the fixed orientation image capture device, wherein the object orientation data is determined based on the image capture device orientation calibration data.

11. The method of claim 10, wherein a portion of a field of view of the fixed orientation image capture device corresponding to capturing the first image overlaps a portion of a field of view of the adjustable orientation image capture device corresponding to capturing the second image.

12. The method of claim 11, wherein determining the feature correlation data based on the first image and the second image includes determining spatial feature correlation data that indicates a correlation between a feature from the first image and a corresponding feature from the second image.

13. The method of claim 12, wherein determining the image capture device orientation calibration data based on the feature correlation data includes using five-point relative positioning based on the spatial feature correlation data.

14. The method of claim 10, wherein a field of view of the fixed orientation image capture device corresponding to capturing the first image is non-overlapping with a field of view of the adjustable orientation image capture device corresponding to capturing the second image.

15. The method of claim 14, wherein determining the feature correlation data based on the first image and the second image includes determining temporal feature correlation data by:
obtaining a third image from the fixed orientation image capture device, the third image sequentially subsequent to the first image;
determining first temporal feature correlation data indicating a correlation between a feature from the first image and a corresponding feature from the third image;
obtaining a fourth image from the adjustable orientation image capture device, the fourth image sequentially subsequent to the second image;
determining second temporal feature correlation data indicating a correlation between a feature from the second image and a corresponding feature from the fourth image;
determining first velocity data based on the first temporal feature correlation data, the first velocity data indicating a velocity of the fixed orientation image capture device;
determining second velocity data based on the second temporal feature correlation data, the second velocity data indicating a velocity of the adjustable orientation image capture device; and
determining relative velocity data based on the first velocity data and the second velocity data.

16. The method of claim 15, comprising:
determining the image capture device orientation calibration data based on the first velocity data and the second velocity data.

17. A non-transitory computer-readable medium comprising instructions stored on a memory, that when executed by a processor, cause the processor to:
obtain a first image from a fixed orientation image capture device of an unmanned aerial vehicle;
obtain a second image from an adjustable orientation image capture device of the unmanned aerial vehicle;
determine object orientation data based on a spatial correlation of a location of an external object within the first image relative to the second image;
determine relative velocity data based upon comparing the first image captured by the fixed orientation image capture data and the second image capture by the adjustable orientation image capture device; and
control movement and velocity of the unmanned aerial vehicle based on the object orientation data and the relative velocity data to track or avoid the external object.

18. The non-transitory computer-readable medium of claim 17, wherein the instructions, when executed by the processor, cause the processor to:
control a trajectory of the unmanned aerial vehicle based on the object orientation data.

19. The non-transitory computer-readable medium of claim 17, wherein the instructions, when executed by the processor, cause the processor to:
determine feature correlation data based on the first image and the second image; and
determine calibration data based on the feature correlation data, the calibration data indicating an orientation of the adjustable orientation image capture device relative to the fixed orientation image capture device.

20. The non-transitory computer-readable medium of claim 19, wherein the calibration data is determined based on the feature correlation data and the relative velocity data.

* * * * *